(12) United States Patent
Namura

(10) Patent No.: US 6,380,713 B2
(45) Date of Patent: Apr. 30, 2002

(54) BATTERY PACK

(75) Inventor: Takashi Namura, Sumoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/840,829

(22) Filed: Apr. 25, 2001

(30) Foreign Application Priority Data

Apr. 28, 2000 (JP) ........................................ 2000-131475

(51) Int. Cl.$^7$ ................................................ H01M 1/46
(52) U.S. Cl. .......................... 320/112; 429/99; 429/100
(58) Field of Search .............................. 320/107, 110, 320/112, 116; 429/96, 97, 99, 100, 149, 151, 152, 155, 154; D13/103, 107; 307/150

(56) References Cited

U.S. PATENT DOCUMENTS

| | | | | |
|---|---|---|---|---|
| 5,015,546 A | * | 5/1991 | Dulaney et al. | |
| 5,143,804 A | * | 9/1992 | McArthur et al. | |
| 5,162,164 A | * | 11/1992 | Dougherty et al. | |
| 5,169,733 A | * | 12/1992 | Savovic et al. | |

* cited by examiner

Primary Examiner—Edward H. Tso
(74) Attorney, Agent, or Firm—Wenderoth, Lind & Ponack, L.L.P.

(57) ABSTRACT

The battery pack holds a first block adjacent to a second block in a case. The first and second blocks are a plurality of circular cylindrical batteries arranged in the same horizontal plane. The first and second blocks are each made up of N batteries lined up side-by-side in parallel fashion to form a lateral battery array, and M perpendicular batteries in close proximity to an electrode end of the lateral battery array and oriented at right angles to the batteries of the lateral battery array. The circular cylindrical batteries of the first and second blocks are arranged with point-by-point symmetry about the center of the rectangular case. Further, the electrode ends of perpendicular batteries protrude beyond a side of the lateral battery array towards the neighboring block to provide center region space between the first and second blocks.

18 Claims, 5 Drawing Sheets

BATTERY PACK

This application is based on application No. 131475 filed in Japan on Apr. 28, 2000, the content of which incorporated hereinto by reference.

BACKGROUND OF THE INVENTION

This invention relates to a battery pack having a case which holds a plurality of circular cylindrical batteries and a printed circuit board.

A battery pack having a case which holds a plurality of circular cylindrical batteries is used for a variety of applications. For each application, it is important to make battery pack charge-discharge capacity large and external size small. In addition, external shape and battery capacity are determined by the electrical equipment the battery pack is attached to. This allows the battery pack to attach to a specific location on the electrical equipment. In prior art battery packs, batteries are lined up parallel to each other and held in a case with no space between batteries. Cylindrical batteries held in a battery pack case and arranged in this manner and are not always in an ideal environment for charging and discharging in all applications. This is because heat evolved from interior batteries is not effectively carried away. Batteries located at the periphery effectively transfer heat to the outside of the case. However, a battery disposed at the interior is surrounded by other batteries which have risen in temperature, and the interior battery itself also emits heat. Consequently, heat cannot be effectively transferred away from an interior battery and its performance can easily degrade due to high temperature effects. This drawback can be eliminated by providing gaps between batteries. However, if gaps are provided between batteries, the battery pack grows unduly in size.

The present invention was developed to resolve these types of drawbacks. Thus it is a primary object of the present invention to provide a battery pack which holds batteries inside a case in an ideal arrangement, and which allows effective heat transfer away from batteries disposed at the interior while minimizing size increase in the battery pack outline.

The above and further objects and features of the invention will more fully be apparent from the following detailed description with accompanying drawings.

SUMMARY OF THE INVENTION

The battery pack of the present invention holds batteries in a case with a first block, which is a plurality of circular cylindrical batteries arranged in the same horizontal plane, and a second block, which is an equivalent configuration of a plurality of circular cylindrical batteries arranged in the same horizontal plane, disposed in an adjacent fashion and in the same horizontal plane. The first and second blocks are provided with N+M circular cylindrical batteries. N+M circular cylindrical batteries are arranged with N batteries lined up side-by-side in parallel fashion to form a lateral battery array, and M perpendicular batteries in close proximity to an electrode end of the lateral battery array and orthogonal to that lateral battery array. The batteries of the first block and the second block are disposed in a rectangular case with point-by-point symmetry about the center-point of the case. Further, an electrode end of the perpendicular batteries protrudes from a side of the lateral battery array towards the side of the adjacent block to create space at the center region between the first and second blocks.

In this patent application, the lateral direction is taken to be the direction of the diameter of a circular cylindrical battery, and the lengthwise direction is taken to be the longer direction of the cylinder axis. Consequently, a lateral battery array means a plurality of batteries lined up side-by-side (not end-to-end) in parallel fashion.

This configuration of battery pack is characterized by holding circular cylindrical batteries in an ideal arrangement, by making the battery pack outline as compact as possible, and by allowing effective heat removal from batteries disposed at the center region. This is because the plurality of circular cylindrical batteries of the battery pack of the present invention are divided into a first block and a second block, and the batteries of the first and second blocks are configured as lateral battery arrays and perpendicular batteries. The batteries of the first and second block are arranged with point-by-point symmetry about the center-point of a rectangular case. In addition, space is provided at the center region between the first and second blocks by protrusion of electrode ends of perpendicular batteries from the sides of lateral battery arrays towards the side of the adjacent block. The center space provided at the center region of the case prevents batteries in that center region from being heated by adjacent batteries, and effectively prevents interior battery degradation due to heating. Consequently, the battery pack of the present invention has the characteristic that high current charging and discharging can be performed without battery performance degradation.

Preferably, circular cylindrical batteries with a length dimension greater than three times the diameter but less than four times the diameter are used for the battery pack of the present invention. In this battery pack, preferably N is 3 and M is 1. Specifically, 3 batteries are lined up side-by-side in a parallel fashion as the lateral battery array, and 1 perpendicular battery is disposed at a right angle to this lateral battery array.

It is also preferable to structure the case of the battery pack of the present invention with a first case and a second case. A wall is provided in the center region space and is formed as a single piece with the first case. Connecting hooks which mate with the wall are formed as a single piece with the second case. The first case and the second case of this battery pack can be reliably connected by joining the connecting hooks to the wall.

Since the first and second cases can be connected at the wall provided in the center region space of this configuration of battery pack, it has the characteristic that the case can be made thin while effectively preventing case deformation such as case expansion.

Further, lead wires are preferably disposed in the center region space of the battery pack of the present invention. This configuration of battery pack is characterized by using the center region space for lead wire disposition and allowing simplified routing of those lead wires.

DETAILED DESCRIPTION OF THE INVENTION

Figure 3:
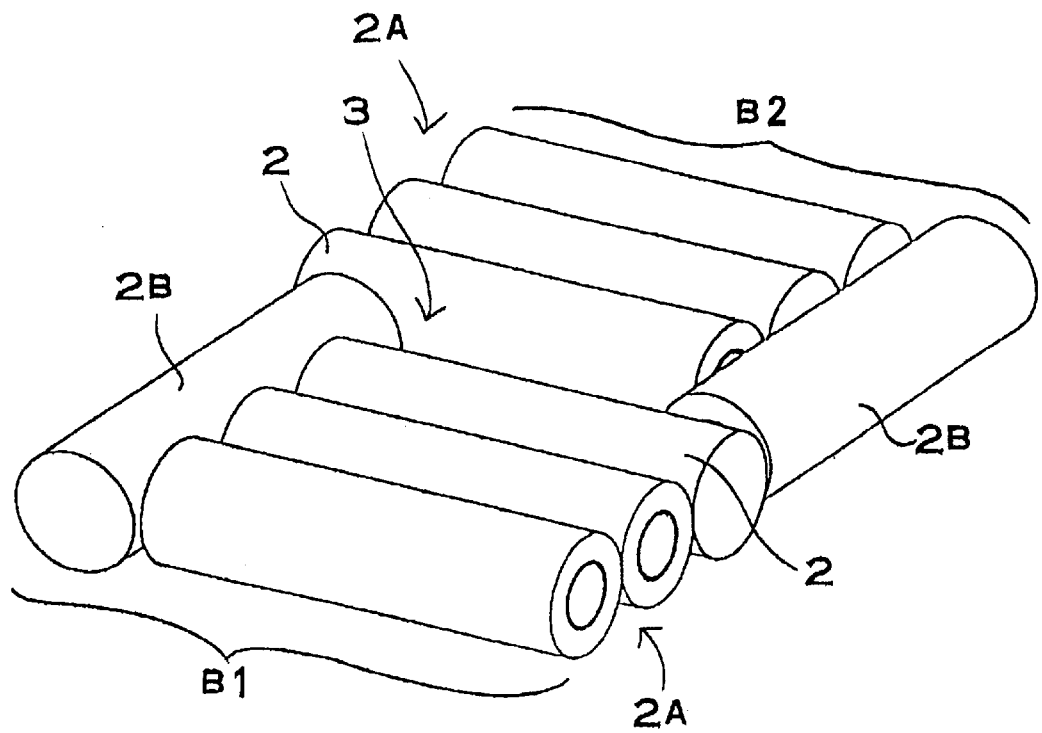
FIG. 3 is an oblique view showing arrangement of the circular cylindrical batteries held in the battery pack shown in FIG. 2.
Figure 4:
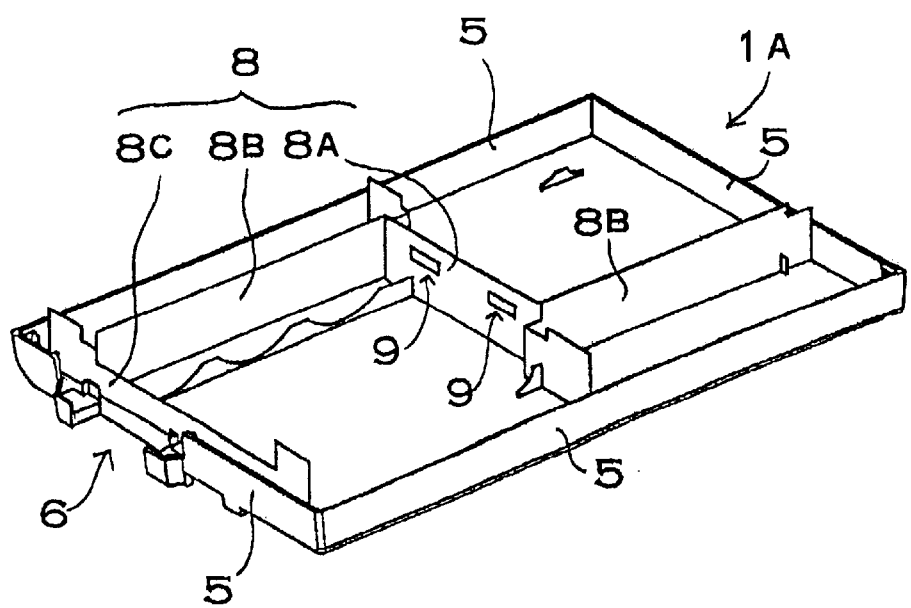
FIG. 4 is an oblique view of the first case of the battery pack shown in FIG. 2.
Figure 5:
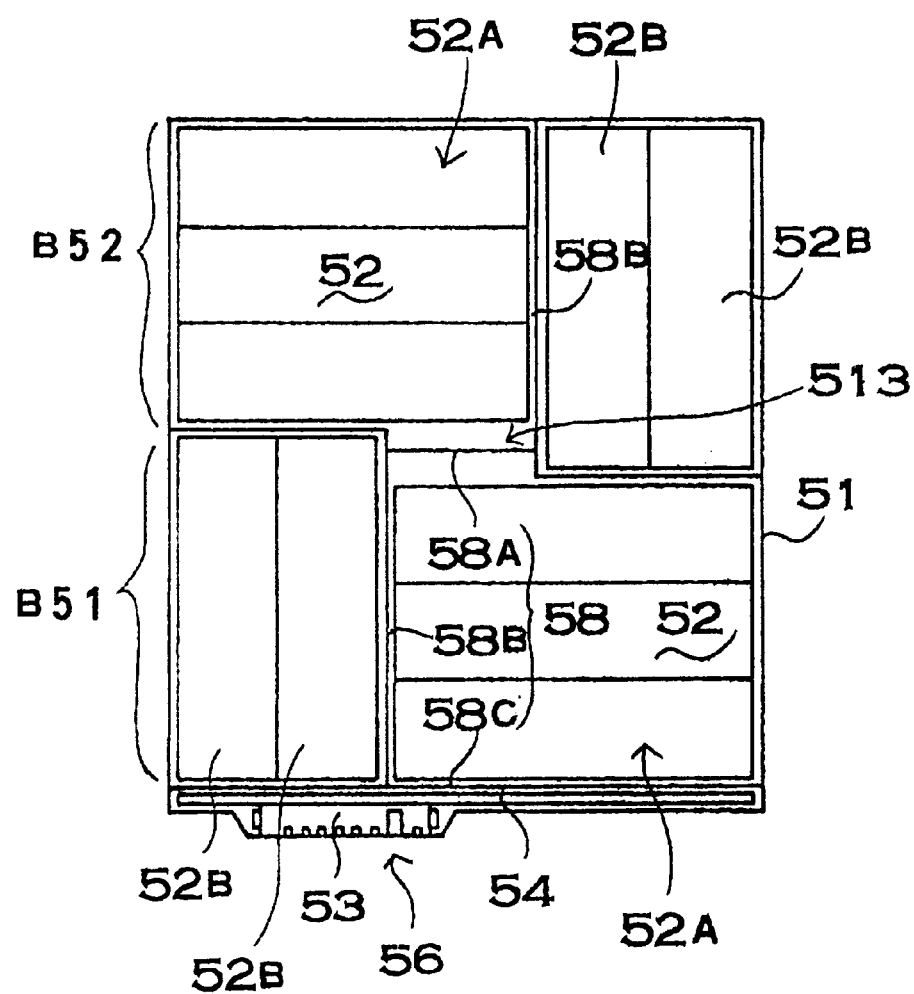
FIG. 5 is a plan view of another embodiment of the battery pack of the present invention.

The battery pack shown in FIGS. 1 through 4 holds a plurality of circular cylindrical batteries 2 in a case 1. The battery pack shown in these figures holds eight circular cylindrical batteries 2 in a case 1. However, the battery pack of the present invention does not restrict the number of circular cylindrical batteries 2 held in a case to eight. For example, as shown in FIG. 5, the battery pack of the present invention may also hold ten circular cylindrical batteries 52 in a case 51. Moreover, the number of circular cylindrical batteries held in a case is varied corresponding to the application.

The circular cylindrical batteries 2, 52 are rechargeable batteries such as lithium ion rechargeable batteries, nickel hydrogen batteries, or nickel cadmium batteries. The circular cylindrical batteries shown in the figures have a length greater than three times the diameter but less than four times the diameter. For example, these are rechargeable batteries with an outline called "SC" or "AA" in Japanese Industrial Standards (JIS). However, other types of circular cylindrical batteries may also be used, such as those with a length greater than two times the diameter but less than three times the diameter, or those with length greater than four times the diameter but less than five times the diameter.

The plurality of circular cylindrical batteries 2, 52 are divided into a first block B1, B51 and a second block B2, B52 and held in the case 1, 51. The first block B1, B51 and second block B2, B52 are held adjacent to each other in the case 1, 51. Further, the first block B1, B51 and second block B2, B52 have the same number of circular cylindrical batteries 2, 52, and all batteries are disposed in the same horizontal plane.

The first block B1, B51 and second block B2, B52 are arranged with the same circular cylindrical battery 2, 52 arrays. However, batteries of the first block B1, B51 and second block B2, B52 are held in the case 1, 51 in a layout which is point-by-point symmetric about the center-point of the case 1, 51. (That is each point is symmetric to a point which is rotated 180° about the center-point.) The first block B1, B51 and second block B2, B52 are made up of a lateral battery array 2A, 52A and perpendicular batteries 2B, 52B. A lateral battery array 2A, 52A is a plurality of circular cylindrical batteries 2, 52 lined up side-by-side in parallel fashion. Perpendicular batteries 2B, 52B are disposed in close proximity to an electrode end of a lateral battery array 2A, 52A, and are arranged at right angles to the batteries of the lateral battery array 2A, 52A.

Figure 1:
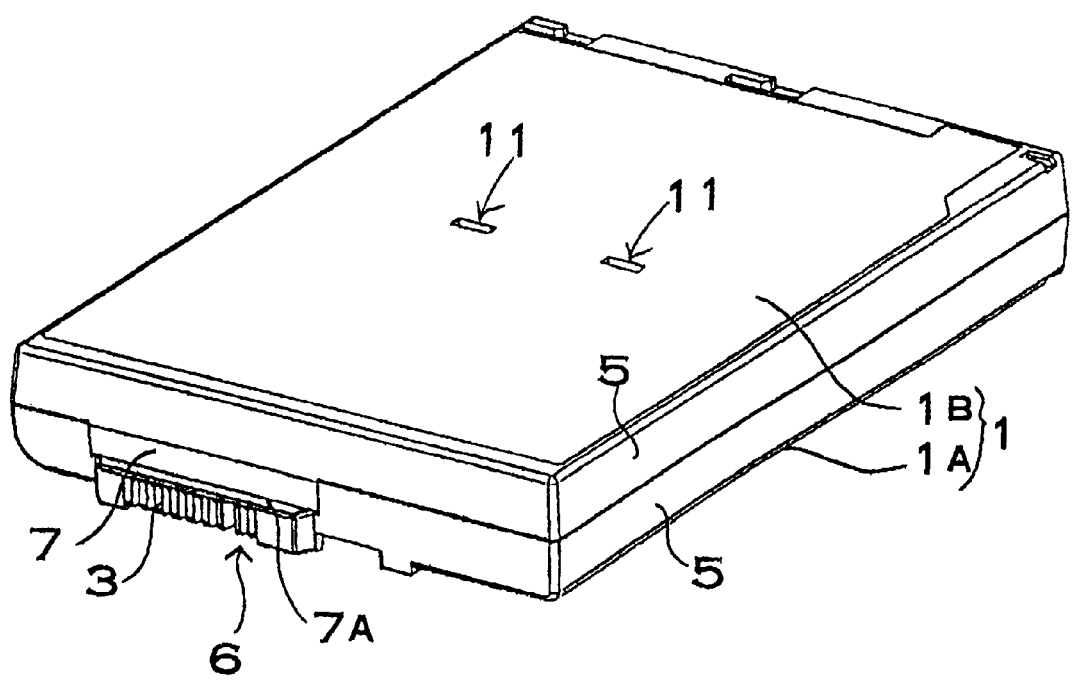
FIG. 1 is an oblique view of an embodiment of the battery pack of the present invention.
Figure 2:
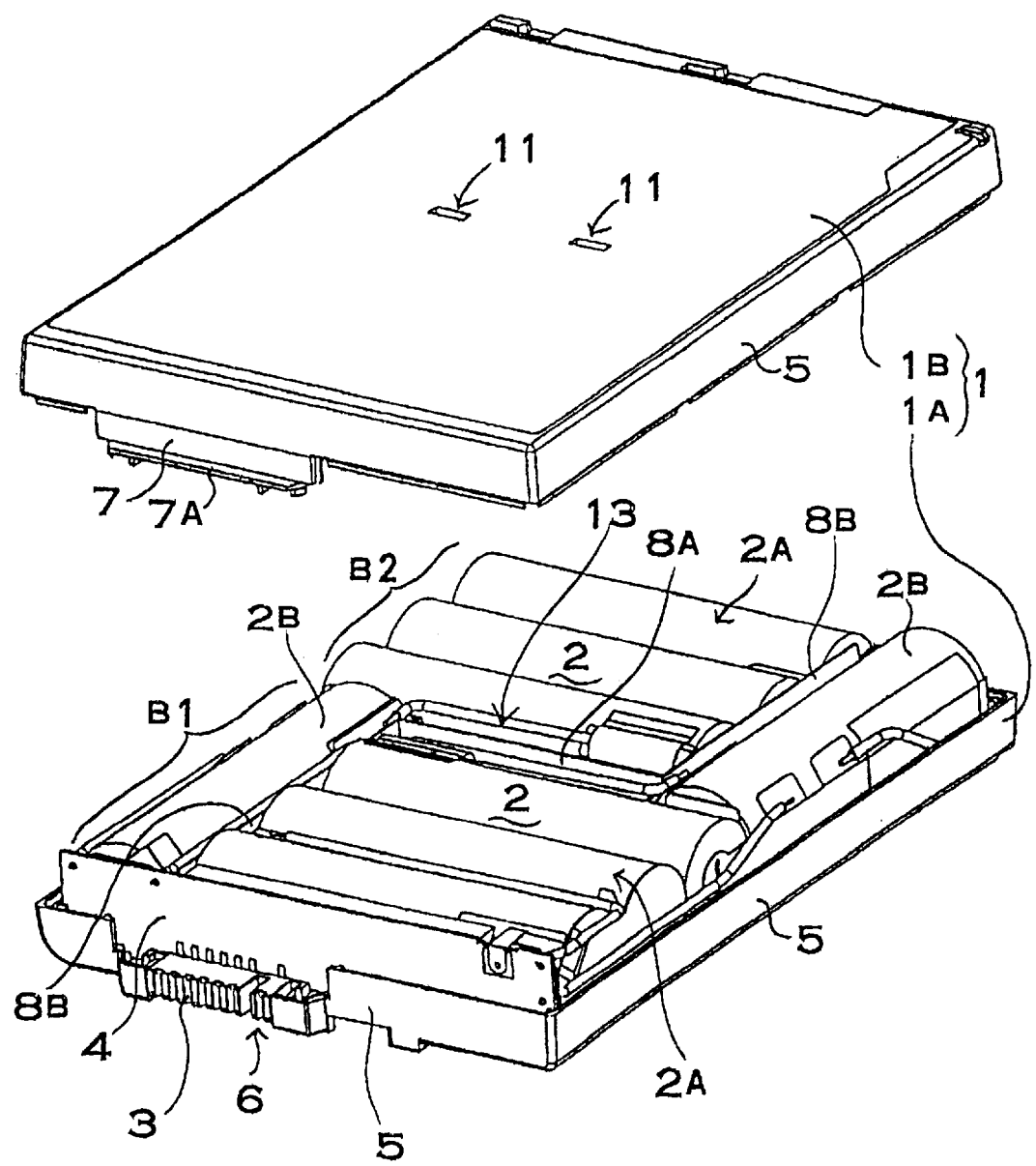
FIG. 2 is an exploded oblique view of the battery pack shown in FIG. 1.

The first block B1 and second block B2 of the battery pack shown in FIGS. 1 through 3 are made up of three batteries lined up side-by-side in parallel fashion to form a lateral battery array 2A, and one perpendicular battery 2B. The first block B51 and second block B52 of the battery pack shown in FIG. 5 are made up of three batteries lined up side-by-side in parallel fashion to form a lateral battery array 52A, and two perpendicular batteries 52B. The lateral battery arrays 2A, 52A of these figures have three rows of batteries lined up side-by-side in parallel fashion with both electrode ends aligned in a straight line.

Perpendicular batteries 2B, 52B are disposed in close proximity to an electrode end of the lateral battery array 2A, 52A. One of the electrode ends of the perpendicular batteries 2B, 52B protrudes beyond a side of the lateral battery array 2A, 52A towards the side of the neighboring block to create space at the center region of the case 1, 51. In FIGS. 2 and 3, the right electrode end of the perpendicular battery 2B of the first block B1 adjoins the second block B2. Consequently, the perpendicular battery 2B is held in the case 1 with its right electrode end protruding beyond the side of the lateral battery array 2A. The left electrode end of the perpendicular battery 2B of the first block B1 is in the same plane as the left edge of the lateral battery array 2A. Namely, the left electrode end of the perpendicular battery 2B does not protrude beyond the side of the lateral battery array 2A. The left electrode end of the perpendicular battery 2B of the second block B2 adjoins the first block B1. Consequently, the perpendicular battery 2B is held in the case 1 with its left electrode end protruding beyond the side of the lateral battery array 2A. The right electrode end of the perpendicular battery 2B of the second block B2 is in the same plane as the right edge of the lateral battery array 2A. Namely, the right electrode end of the perpendicular battery 2B does not protrude beyond the side of the lateral battery array 2A.

The battery pack shown in FIGS. 1 through 4 holds circular cylindrical batteries 2 with a length greater than three times the diameter but less than four times the diameter. Consequently, the perpendicular battery 2B is longer than width across three batteries lined up side-by-side in the lateral battery array 2A. If the length of the perpendicular battery 2B is, in this manner, greater than the width across the lateral battery array 2A, the electrode end of the perpendicular battery 2B can extend towards the neighboring block beyond the side of the lateral battery array 2A and establish space 13 at the center region of the case 1. In addition, the electrode end of the perpendicular battery 2B positioned outboard can be disposed in the same plane as the outboard edge of the lateral battery array 2A. However, it is not always necessary for the outboard electrode end of the perpendicular battery to be disposed in the same plane as the side of the lateral battery array without protruding beyond that side of the lateral battery array.

In the manner described above, by various combinations of the numbers of batteries in the lateral battery array and perpendicular batteries which make up the first and second blocks of the battery pack of the present invention, space at the center region of the case can be established. The optimum number of batteries in the lateral battery array and perpendicular batteries which make up each block are determined according to various conditions such as the total circular cylindrical battery count, circular cylindrical battery diameter and length, and case outline.

The case 1 is formed plastic, and is divided into a first case 1A and second case 1B to allow easy assembly with the batteries and printed circuit board 4 held inside. The first case 1A and second case 1B have the overall shape of a rectangular box and are provided with perimeter wails 5 along the outside edges, which are formed as a single piece with the case. Except for the region where the connector 3 is attached, perimeter walls 5 are provided along all sections of the case periphery. The top edges of perimeter walls 5 on one case side are provided with grooves while the top edges of perimeter walls 5 on the other case side are provided with projections to allow reliable connection of perimeter wall 5 edges by ultrasonic welding. With perimeter wall 5 projections mated with corresponding grooves, perimeter walls 5 of the first case 1A and the second case 1B connect with accurate alignment, and they can be reliably joined ultrasonically for a strong connection.

The first case 1A is provided with section walls 8 extending from its inside surface and formed as a single piece with the case. The section walls 8 hold the batteries in specified locations. As shown in the oblique view of FIG. 4, section walls 8 are established between the first and second blocks, between the lateral battery array 2A and perpendicular battery 2B of each block, and between the batteries and the printed circuit board 4. The section walls 8 of the figures extend above the perimeter walls 5 and extend to positions near the upper surfaces of the batteries.

The section walls 8 of the figures are made up of a center wall 8A provided approximately at the center of the case 1, end section walls 8B connected perpendicular to both ends of the center wall 8A, and a circuit board support wall 8C disposed between the printed circuit board 4 and the batteries. The center wall 8A retains batteries of the first block B1 and the second block B2 in specified locations and provides space 13 at the center region of the case 1. The center wall 8A is bent at both ends in step fashion, and the ends of these bent regions connect with perimeter walls 5. The bent regions are disposed in positions which close off the ends of regions inside end section walls 8B. The end section walls 8B are disposed at a distance from the perimeter walls 5 allowing perpendicular battery 2B insertion between end section walls 8B and perimeter walls 5. Further, the end section wall 8B located at the upper left in FIG. 4 is connected to the circuit board support wall 8C established between the printed circuit board 4 and the batteries. The circuit board support wall 8C is disposed parallel to a perimeter wall 5. The printed circuit board 4 is disposed between the circuit board support wall 8C and the perimeter wall 5. The end section wall 8B located at the lower right in FIG. 4 is connected at one end to a perimeter wall S. In FIG. 5, 58 shows the section walls, 58A is the center wall, 58B are the end section walls, and 58C is the circuit board support wall.

When batteries of the first block B1 and second block B2 are loaded into the case 1, the center wall 8A and end section walls 8B organize the plurality of batteries into sections. This makes battery arrangement and alignment simple and improves assembly efficiency while providing space 13 at the center region of the case 1. In addition, when the battery pack is inclined, for example when it is carried, the weight of all the batteries inside does not become concentrated in one part of the case 1, and added load on the case 1 is reduced. Further, The routing of lead wires between batteries and between batteries and the printed circuit board 4 can be simplified by disposing wires along the center wall 8A and end section walls 8B. The circuit board support wall 8C is a barrier to separate the printed circuit board 4 from the batteries. The circuit board support wall 8C prevents corrosion of the printed circuit board 4 due to electrolyte leaked from a battery, and also prevents damage to electronic components mounted on the printed circuit board 4.

The center wall 8A is provided with latches 9 for connection with the second case 1B. For reliable connection with the second case 1B, the center wall 8A is preferably provided with a plurality of latches 9. The center wall 8A of the figures is provided with two latches 9. The center wall 8A of the figures has latch holes which pass through the wall to serve as latches 9. These latches 9 are established in a thin section wall 8 and are characterized by reliable connection with connecting hooks 10 on the second case 1B. However, the latches 9 do not necessarily have to be latch holes, and any configuration which can mate with connecting hooks 10 may also be implemented. For example, although it is not illustrated, cavities which can interlock with connecting hooks 10 may also be implemented.

Figure 6:
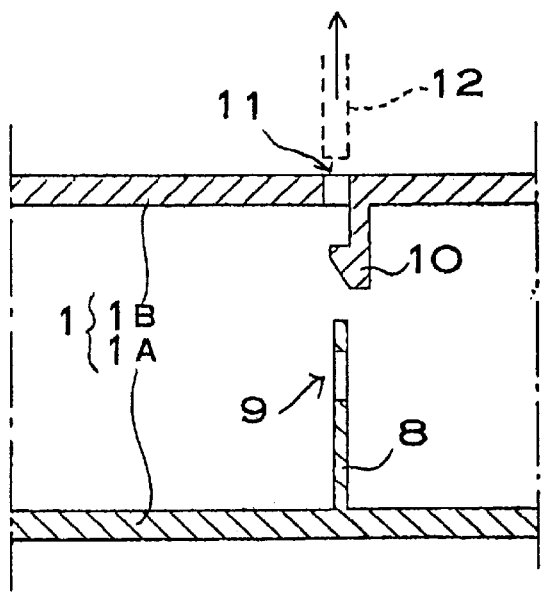
FIG. 6 is a cross-section view showing the connecting structure between the first and second cases of the battery pack shown in FIG. 2.
Figure 7:
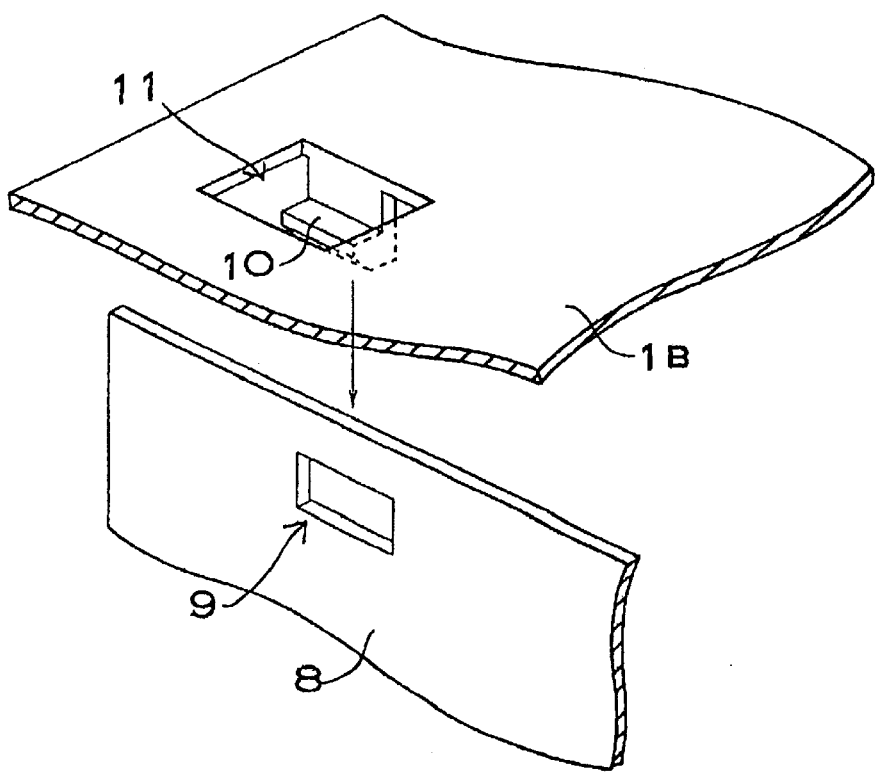
FIG. 7 is an oblique view with one part in cross-section showing the connecting structure between the first and second cases of the battery pack shown in FIG. 2.

As shown in FIGS. 6 and 7, the second case 1B is provided with connecting hooks 10 which project from the inside surface of the case, interlock with section wall 8 latches 9, and are formed as a single piece with the case. Through holes 11 are established in the second case 1B at locations where connecting hooks 10 are provided. A through hole 11 is provided on the side of the connecting hook 10 having a protrusion at its tip. In FIG. 6, the through hole is opened on the left side of the connecting hook 10. A connecting hook 11 of the second case 1B is formed, as shown by the broken line in FIG. 6, by a mold structure withdrawn through the case. Through holes 11 are closed by sheet attached to the case surface.

In the case 1 described above, after circular cylindrical batteries 2, printed circuit board 4, and all other parts are put inside the first case 1A, the second case 1B is attached to the first case 1A. At this point, connecting hooks 10 of the second case 1B interlock with latches 9 of the first case 1A to connect the cases. Subsequently, perimeter walls 5 are connected by ultrasonic welding. The case 1 can be made into a rugged structure with ultrasonically welded perimeter walls 5. However, the perimeter walls of the first and second cases of the battery pack of the present invention may also be joined by adhesive bond or by interlocking latches, etc.

Further, a perimeter wall 5 is not provided at the region of the first case 1A where the connector 3 is exposed to the outside, and this region is the electrode attachment section 6. A perimeter wall 5 of the second case 1B is provided with a pressure plate 7 which projects from the wall and is formed as a single piece with the case. This pressure plate 7 serves to sandwich a connector 3 set in the electrode attachment section 6. The pressure plate 7 is bent into an L-shape at its bottom end (in the figures) to provide a foot 7A which is formed by single piece construction. This pressure plate 7 foot 7A presses from above onto the connector 3 to fix it in place. In FIG. 5, 53 shows the connector, 54 is the printed circuit board, and 56 is the electrode attachment section.

The connector 3 is fixed to the printed circuit board 4. The connector 3 is attached in a fixed position on the case 1, and the printed circuit board 4 is thereby disposed in a fixed position in the case 1 via the connector 3. The connector 3 has alignment projections protruding from both ends to fix the position of the connector 3 on the first case 1A. The second case 1B is provided with cavities to mate with these alignment projections at specified locations. The connector 3 is attached in a fixed position with respect to the first case 1A by engaging the second case 1B cavities with the first case 1A alignment projections.

The printed circuit board 4 implements battery protection circuitry, or it has affixed circuit elements such as semiconductor devices which compute remaining battery capacity. The battery pack shown in FIG. 2 has its printed circuit board 4 housed in the space provided between the circuit board support wall 8C and a perimeter wall 5. The printed circuit board 4 has semiconductor devices such as field effect transistors (FETs), bipolar transistors, light emitting diodes (LEDs), one-chip-microcomputer, and semiconductor memory mounted on its surface to realize a battery protection circuit and a circuit to compute remaining battery capacity.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery pack comprising:
   (a) a case;
   (b) a first block which is held in the case, and has a plurality of circular cylindrical batteries arranged in the same horizontal plane;
   (c) a second block which has the same shape as the first block with a plurality of circular cylindrical batteries arranged in the same horizontal plane, and which is held in the case adjacent to, and lined up in the same horizontal plane as the first block;
   (d) both the first block and the second block are provided with N+M circular cylindrical batteries;
   (e) the N+M circular cylindrical batteries are made up of a lateral battery array of N batteries lined up side-by-side in parallel fashion, and M perpendicular batteries disposed in close proximity to an electrode end of the lateral battery array and oriented at right angles to the batteries of the lateral battery array; and
   (f) the first block and second block circular cylindrical batteries are arranged with point-by-point symmetry about the center of the rectangular case, the electrode ends of perpendicular batteries protrude beyond a side of the lateral battery array towards the neighboring block, and circular cylindrical batteries are held in the case with center region space provided between the first block and second block.

2. A battery pack as recited in claim 1 wherein the overall length of a circular cylindrical battery is greater than three times the diameter but less than 4 times the diameter.

3. A battery pack as recited in claim 2 wherein N is three and M is one.

4. A battery pack as recited in claim 2 wherein N is three and M is two.

5. A battery pack as recited in claim 1 wherein the case is made up of a first case and a second case, both the first case and second case have an overall rectangular box shape, perimeter walls are formed along perimeter edges by single piece construction, and these perimeter walls are joined together to connect the case.

6. A battery pack as recited in claim 5 wherein the top edges of perimeter walls on one case side are provided with grooves, and top edges of perimeter walls on the other case side are provided with projections which can mate with the grooves.

7. A battery pack as recited in claim 6 wherein perimeter walls are joined with projections and grooves mated, and the perimeter walls of the first case and the second case are connected by ultrasonic welding.

8. A battery pack as recited in claim 5 wherein the first case is provided with section walls projecting from its inside surface formed by single piece construction, and batteries are retained in fixed positions by these section walls.

9. A battery pack as recited in claim 8 wherein the first case is provided with a section wall in the center region space formed by single piece construction.

10. A battery pack as recited in claim 5 wherein the first case is provided with section walls projecting from its inside surface formed by single piece construction, and the second case is provided with connecting hooks which connect to a section wall and are formed by single piece construction.

11. A battery pack as recited in claim 10 wherein the second case has through holes opened at locations where connecting hooks are provided, and these through holes are opened on the side of the connecting hook having a protrusion at its tip.

12. A battery pack as recited in claim 5 wherein the first case is provided with section walls projecting from its inside surface formed by single piece construction, and these section walls are made up of a center wall provided approximately at the center of the case, end section walls connected perpendicular to both ends of the center wail, and a circuit board support wall disposed between the printed circuit board and the batteries.

13. A battery pack as recited in claim 12 wherein the center wall retains batteries of the first block and the second block in fixed positions, and provides space at the center region of the case.

14. A battery pack as recited in claim 12 wherein the center wall is bent at both ends in step fashion, and the ends of these bent regions connect with perimeter walls.

15. A battery pack as recited in claim 14 wherein the bent regions are disposed in positions which close off one end of regions created by end section walls.

16. A battery pack as recited in claim 12 wherein end section walls are separated from perimeter walls to allow perpendicular batteries to be held between the end section walls and perimeter walls.

17. A battery pack as recited in claim 5 wherein the first case is provided with section walls projecting from its inside surface formed by single piece construction, and these section walls project above the perimeter walls to a position near the upper surface of the batteries.

18. A battery pack as recited in claim 1 wherein lead wires are disposed in the center region space of the battery pack.

* * * * *